United States Patent [19]
Hiraiwa

[11] Patent Number: 5,317,633
[45] Date of Patent: May 31, 1994

[54] EXCHANGING SYSTEM AND METHOD OF ESTABLISHING DATA CALL THEREOF

[75] Inventor: Masashi Hiraiwa, Yokohama, Japan

[73] Assignee: Hitachi, Ltd., Tokyo, Japan

[21] Appl. No.: 570,112

[22] Filed: Aug. 17, 1990

[30] Foreign Application Priority Data

Oct. 30, 1989 [JP] Japan ................................. 1-279990

[51] Int. Cl.⁵ .......................................... H04M 7/06
[52] U.S. Cl. .................................... 379/230; 370/60.1; 379/221
[58] Field of Search ................. 379/230, 207, 94, 112, 379/221, 220; 370/60.1, 62

[56] References Cited

U.S. PATENT DOCUMENTS

| | | | |
|---|---|---|---|
| 4,723,272 | 2/1988 | Maat | 379/211 |
| 4,811,334 | 3/1989 | Maat | 379/230 X |
| 4,811,388 | 3/1989 | Westerhof et al. | 379/229 |
| 4,924,500 | 5/1990 | Lewis et al. | 379/201 |
| 5,048,081 | 9/1991 | Gavaras et al. | 379/221 |
| 5,093,827 | 3/1992 | Franklin et al. | 370/60.1 |

FOREIGN PATENT DOCUMENTS 61-177059 8/1986 Japan.

OTHER PUBLICATIONS

*Telecommunications Switching Principles*, M. T. Hills, The MIT Press, 1989, pp. 155-159.
*Digital Telephony*, John Bellamy, John Wiley & Sons, 1982, pp. 367-371.
"The Building of Intelligent Networks . . .", J. Donogue et al., *Commutation & transmission*, No. 2-1989 (Sotelec, Paris, France), pp. 5-22.

*Primary Examiner*—Thomas W. Brown
*Attorney, Agent, or Firm*—Antonelli, Terry, Stout & Kraus

[57] ABSTRACT

An exchanging system in which data is transferred between a plurality of exchange offices connected to a switch network such that data is transferred between files associated with the respective exchange offices. The exchanging system includes a user process for outputting an input/output request to a file of a particular exchange office of a user, an input/output control unit operative in response to the input/output request from the user process for outputting an access request to an exchanging system of another particular communicating exchange office to which the file belongs, and a signal connection unit operative based on the access request for outputting signal connection control information to the particular exchange office to establish a connection to the exchange office to which the particular file belongs.

9 Claims, 6 Drawing Sheets

| CALL NUMBER | |
|---|---|
| INITIATION ADDRESS | OFFICE IDENTIFICATION CODE |
| | USER PROCESS NAME |
| TERMINATION ADDRESS | OFFICE IDENTIFICATION CODE |
| | USER PROCESS NAME |
| FILE NAME | |
| FILE ATTRIBUT INFORMATION | |
| ACCESS FORMAT | |
| POINTER TO INPUT / OUTPUT BUFFER | |

FIG. 6A

| ROUTING LABEL | |
|---|---|
| MESSAGE TYPE CODE | |
| CALL NUMBER | |
| INITIATION ADDRESS | OFFICE IDENTIFICATION CODE |
| | USER PROCESS NAME |
| TERMINATION ADDRESS | OFFICE IDENTIFICATION CODE |
| | USER PROCESS NAME |
| FILE NAME | |
| FILE ATTRIBUT INFORMATION | |
| ACCESS FORMAT | |

FIG. 6B

| ROUTING LABEL |
|---|
| MESSAGE TYPE CODE |
| CALL NUMBER |
| REQUEST FUCTION |
| ACCESS FORMAT |
| DATA |

EXCHANGING SYSTEM AND METHOD OF ESTABLISHING DATA CALL THEREOF

BACKGROUND OF THE INVENTION

The present invention relates to an exchanging system and a method of establishing a call thereof suitable for a data transfer to be achieved between exchange offices using input/output devices respectively disposed in the exchange offices.

Recently, with expansion of services of exchange or switch systems, a high-speed transfer of a great amount of data has been required to be conducted between input/output devices installed in the respective exchange offices. However, in the conventional method of transferring data between the offices, input/output devices are connected to modems by means of input/output ports linked with such devices as maintenance terminals of the offices so as to accomplish data transfer operations between the input/output devices via a telephone line. This data transfer method of the prior art has been a hindrance when attempts are made to implement transparent services in the expanding networks, for example, to improve the transfer speed, transfer quality, and the line utilization efficiency. In this regard, a method of transferring data between exchange offices of this kind has been described, for example, in the JP-A-61-177059.

The input/output port ordinarily employed in the prior art is generally provided with a modem interface (e.g. RS232C, V24/28, or the like) and hence the transmission speed thereof is limited to a low speed of about 9.6 kbps. Furthermore, a communication line between the exchange offices is usually adopted for the data transfer between the input/output devices or equipment. Consequently, as compared with an ordinary telephone call, the transfer of a large amount of data such as a file transfer takes a considerably longer period of time during which the line is occupied. Moreover, for a solid failure of the line during a data transfer between exchange offices, there has not been prepared a backup line or an alternative channel. This consequently leads to a problem of processing to be achieved by the end users to cope with the failure or to retry the data transfer.

SUMMARY OF THE INVENTION

It is therefore an object of the present invention to provide an exchanging system for transferring data between exchanging offices and a method of establishing a call thereof in which the data transfer between input/output devices installed in the offices is achieved via a common channel signaling network so as to accomplish a highly reliable data transfer without reserving a communication line, thereby solving the problems of the conventional technology.

In order to achieve the object above, in the exchanging system for transferring data between exchange offices, a common channel signaling method is adopted as a method of transferring signals between the exchange offices to be relayed via digital lines such that the data transfer between a user and an input/output device installed between the exchange offices is achieved via a common channel signaling line. As for a method of establishing a call, each time an input/output request occurs from a user to an input/output device, a connection is established between the user and the pertinent input/output device to accomplish a packet transfer between the user and the input/output device via a common channel signal network.

Furthermore, in order to conduct the packet transfer by use of an identical means independently of the configuration of various input/output devices installed in the network, there is disposed means for uniquely identifying a unit of connection associated with an input/output request from a user to an input/output device in the network, the unit being a file as a unit meaningful for the user regardless of the configuration of the input/output devices. Moreover, there is disposed means which conducts input/output operations on the file in a unit of records stipulated by attribute information of the file irrespective of the input/output device configuration.

In accordance with the exchanging system for transferring data between exchange offices and the call establishing method, data between the user and the input/output device is transferred as a common channel signaling packet between the offices via a common channel signaling network. Consequently, the data transfer can be carried out with a high reliability.

In addition, owing to provision of the file input/output means between the exchange offices independent of the configurations of files and input/output devices, the packet transfer can be conducted by use of an identical means irrespectively of the configuration of various input/output devices existing in the network.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Referring now to the drawings, description will be given of embodiments according to the present invention.

Figure 1:
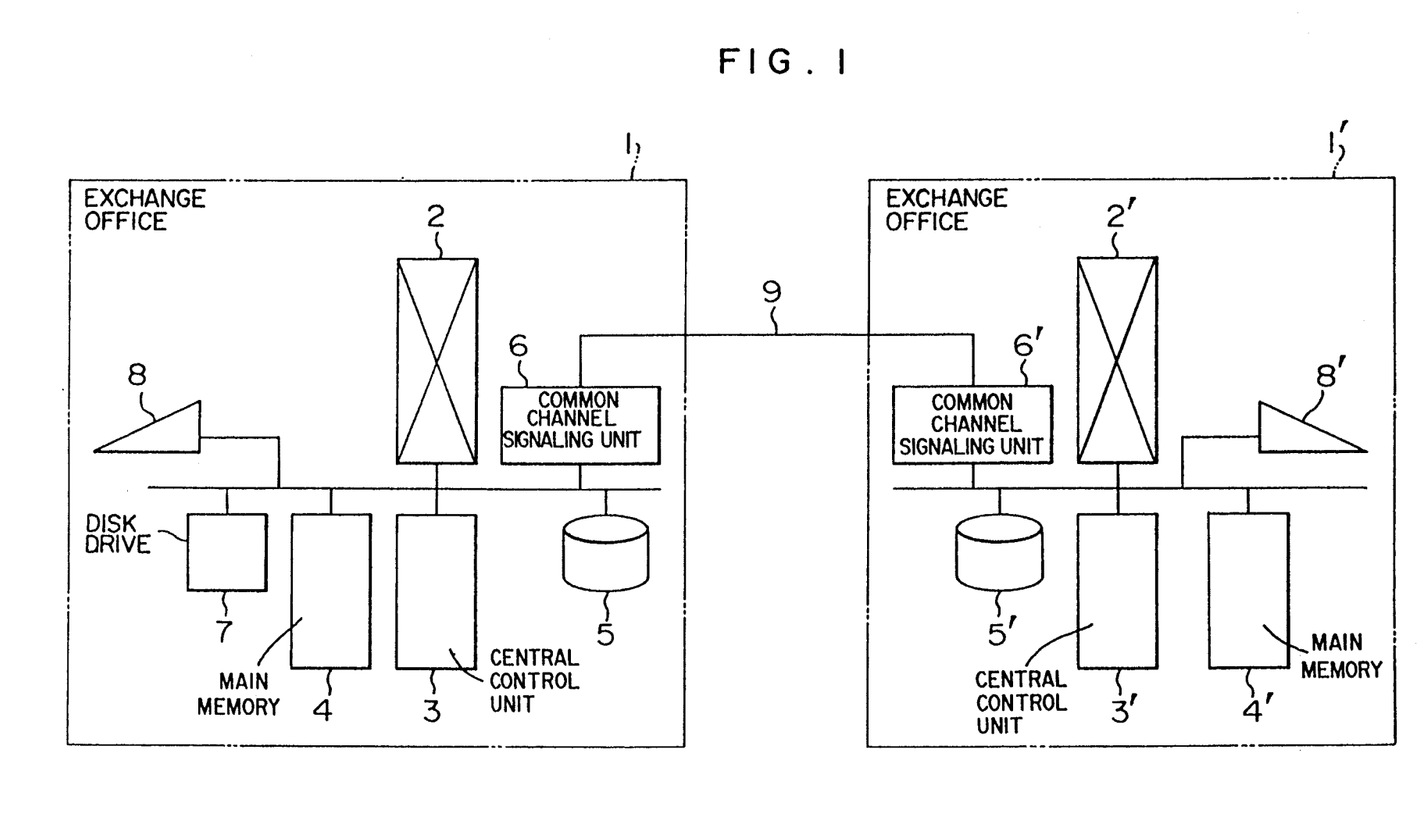
FIG. 1 is a diagram showing a relay method in an embodiment of a method of transferring data between exchange offices in accordance with the present invention.

FIG. 1 shows a relay method in an embodiment of an exchanging system for transferring data between exchange offices in accordance with the present invention. This is an example of a down-load operation in a switch network including digital lines in which office data stored on a floppy disk of a floppy disk drive installed in a central exchange office is transferred onto a hard disk in another exchange office. In the configuration of FIG. 1, exchange offices 1 and 1' respectively include main control units 3 and 3', main memories 4 and 4', hard disks 5 and 5', and common channel signaling units 6 and 6'. Moreover, the exchange office 1 comprises a floppy disk drive 7 and a maintenance terminal equipment 8. Signals between the exchange offices 1 and 1' are relayed by means of a digital line 9. Incidentally, the configuration shown in FIG. 1 only includes constituent components to be controlled by the central control units 3 and 3' for explanation of the operation of embodiment. Namely, other elements not directly related to the operation are omitted in this diagram.

In a down-load operation of exchange office data of FIG. 1, when a file name (for example, a subscriber data name) of objective office data and a name of an exchange office 1' to which the office data is to be transferred are inputted from the maintenance terminal 8 of the exchange office 1, the central control unit 3 sequentially reads office data from the floppy disk of the floppy disk drive 7 such that the data is sent via the digital line 9 disposed between the exchange offices 1 and 1' to be stored on the hard disk 5' of the office 1'. The digital line 9 is used to transfer signals between the exchange offices 1 and 1'. The signals are transferred through the common channel signaling units 6 and 6' operating under control of the central control units 3 and 3', respectively. As the signaling method between exchange offices, the No. 7 common channel signaling procedure is employed as recommended by the CCITT in which the office data is configured in a packet according to the signaling scheme stipulated by the No. 7 common channel signaling procedure.

Figure 2:
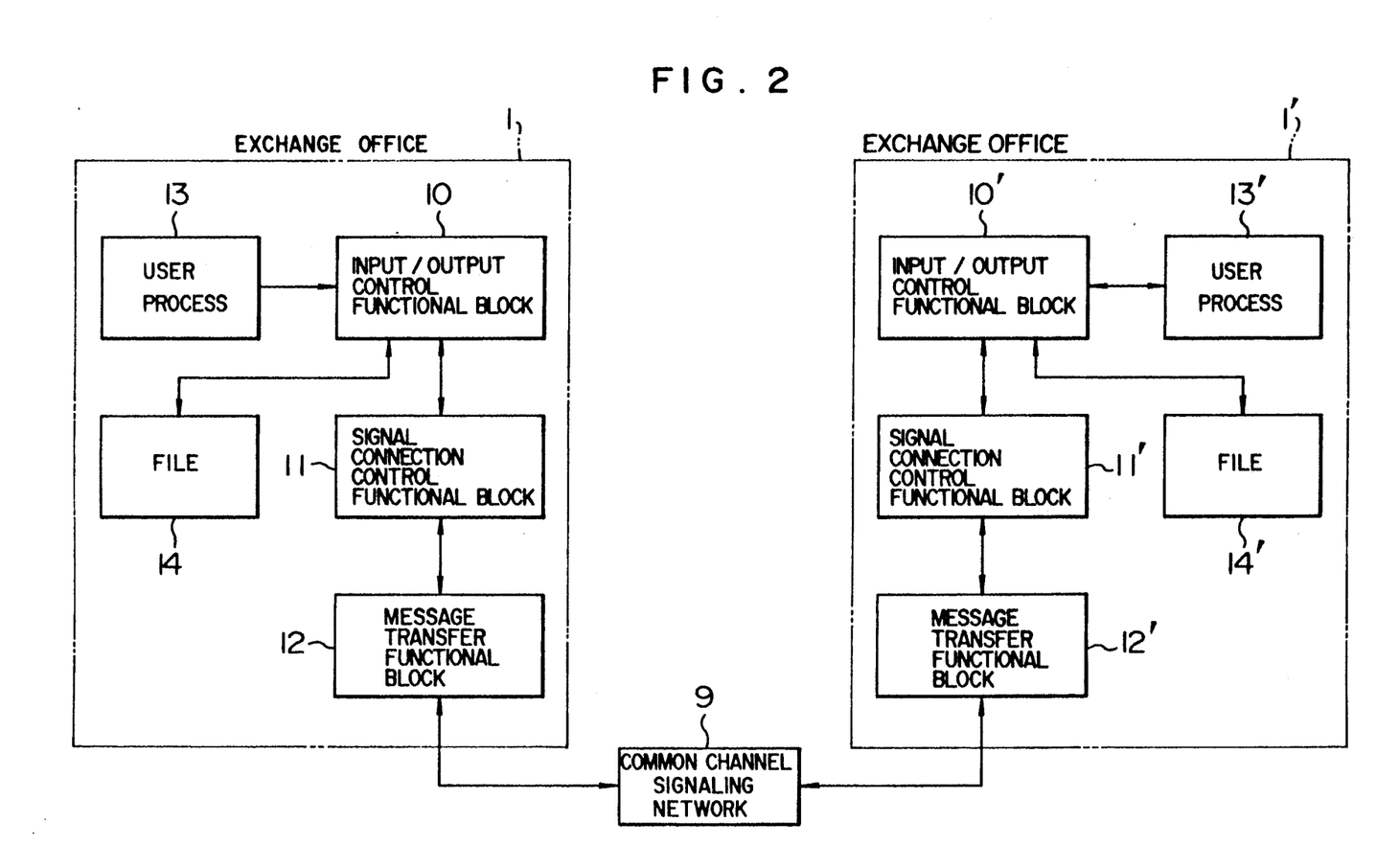
FIG. 2 is a functional configuration diagram showing a data transfer operation of FIG. 1.

FIG. 2 shows the functional configuration of the data transfer between exchange offices 1 and 1' of FIG. 1. Referring now to the constitution of FIG. 2, a description will be given of the functional configuration associated with an operation method in which an office data record read from the floppy disk of the floppy disk drive 7 in the office 1 of FIG. 1 is transferred via the signal line 9 to the exchange office 1'.

Functionally, the exchange office 1 includes a user process 13, an input/output control functional block 10, a signal connection control functional block 11, and a message transfer functional block 12. The input/output control functional block 10 is connected to input/output devices such as a floppy disk drive, a main memory 4, and a hard disk 5 for storing therein a plurality of record data (files).

In the configuration of FIG. 2, the user process 13 can issue a request, for example, to transfer contents of a particular file (record data in an area specified in a memory) associated with its own office 1 to a particular record area belonging to another exchange office 1' or to transfer a particular file of the office 1' to a particular record area of its own exchange office 1. In this operation, the input/output devices of the files need not be designated, namely, only the exchange offices and the files are required to be specified.

Moreover, the input/output control unit 10 develops a function, in response to an access request to a particular file from the user process 13 of its own exchange office 1 or in association with the signal connection control functional block 11 having received an input of an access signal from another exchange office 1', to output record data of an area specified in the memory 4 to a file of the office 1' or to receive record data (of a file) from a file of the specified office 1' so as to store the data in an area specified in the memory 4 of its own office 1.

In this regard, a file indicates a unit disposed for the user process 13 to identify a group of record data, for example, office data for implementing a switch service. For each exchange office, the memory 4 is loaded with a file directory of such files in a format of FIG. 3. The user process 13 or the signal connection control functional block 11 presents a file number, which is interpreted by the input/output control functional block 10 to uniquely identify a file.

Figure 3:
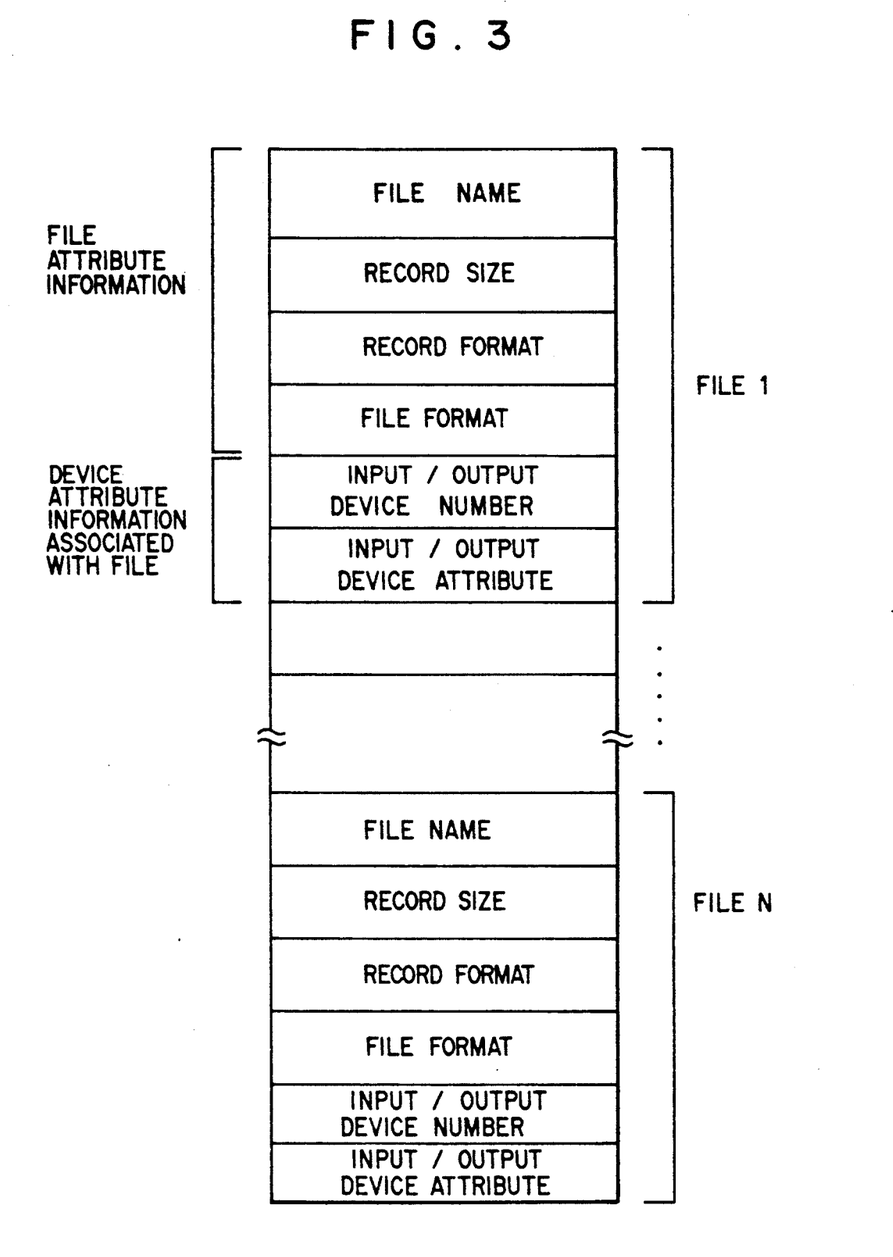
FIG. 3 is a schematic diagram useful to explain an example of a file directory of FIG. 1.

FIG. 3 is a schematic diagram for explaining an example of the file directory loaded on the memory 4 of FIG. 1. For each file, the file directory of FIG. 3 includes file attribute information and device attribute information associated therewith. The file attribute information comprises fields of a file name, a record size, a record format, and a file format, respectively. The file attribute information is uniquely determined for each file in the network and is employed to identify the file in the network. On the other hand, the device attribute information includes fields of an input/output device number and an input/output device attribute, respectively. The device attribute information is used by the input/output control functional block 10 to identify a physical input/output device related to a specified file. For example, a disk controller number and a disk drive number are denoted for a hard disk in this embodiment.

The signal connection control functional block 11 here develops a function, in response to an input/output request from the input/output control functional block 10 or to a call termination request from the message transfer functional block 12 succeeding this functional block 11, to temporarily establish a connection to the communicating office 1', thereby enabling the user process 13 to achieve a data transfer. In this regard, in the operation to establish the temporary connection, there is established a call connection to be used by the user process to accomplish a data transfer in a connection oriented fashion to an input/output device via the switch network.

In this situation, the input/output request from the input/output control functional block 10 to the signal connection control functional block 11 is processed through the following transactions. First, a request is made for a temporary connection for a data transfer to a file specified in another specified exchange office 1' (to be called OPEN herebelow). Second, a request is made to output a record edited in the memory 4 to the designated file of the specified office 1' in a specified access format (to be called PUT herebelow). Third, a request is made to load the memory 4 with a record in the access format designated by the office 1' (to be called GET herebelow). Fourth, a request is issued to temporarily release the connection for a data transfer to the file of the denoted office 1' (to be called CLOSE herebelow).

The signal connection control functional block 11 produces signal connection control information in response to an OPEN request issued from the input/output control functional block 10 or the message transfer functional block 12, thereby establishing a connection between the exchange offices.

The message transfer functional block 12 develops functions ranging from level 1 to level 3 procedures stipulated in the No. 7 common channel signaling method. That is, the message transfer functional block 12 supports a function in response to a message transfer request from the signal connection control functional block 11 to accomplish a message transfer with the message transfer functional block 12' of the partner office 1' in accordance with a procedure of the No. 7 common channel signaling method. The function also includes a message transfer function to be implemented between two points and an alternative signal routing function to be achieved when a failure is detected in a signal path.

Figure 4:
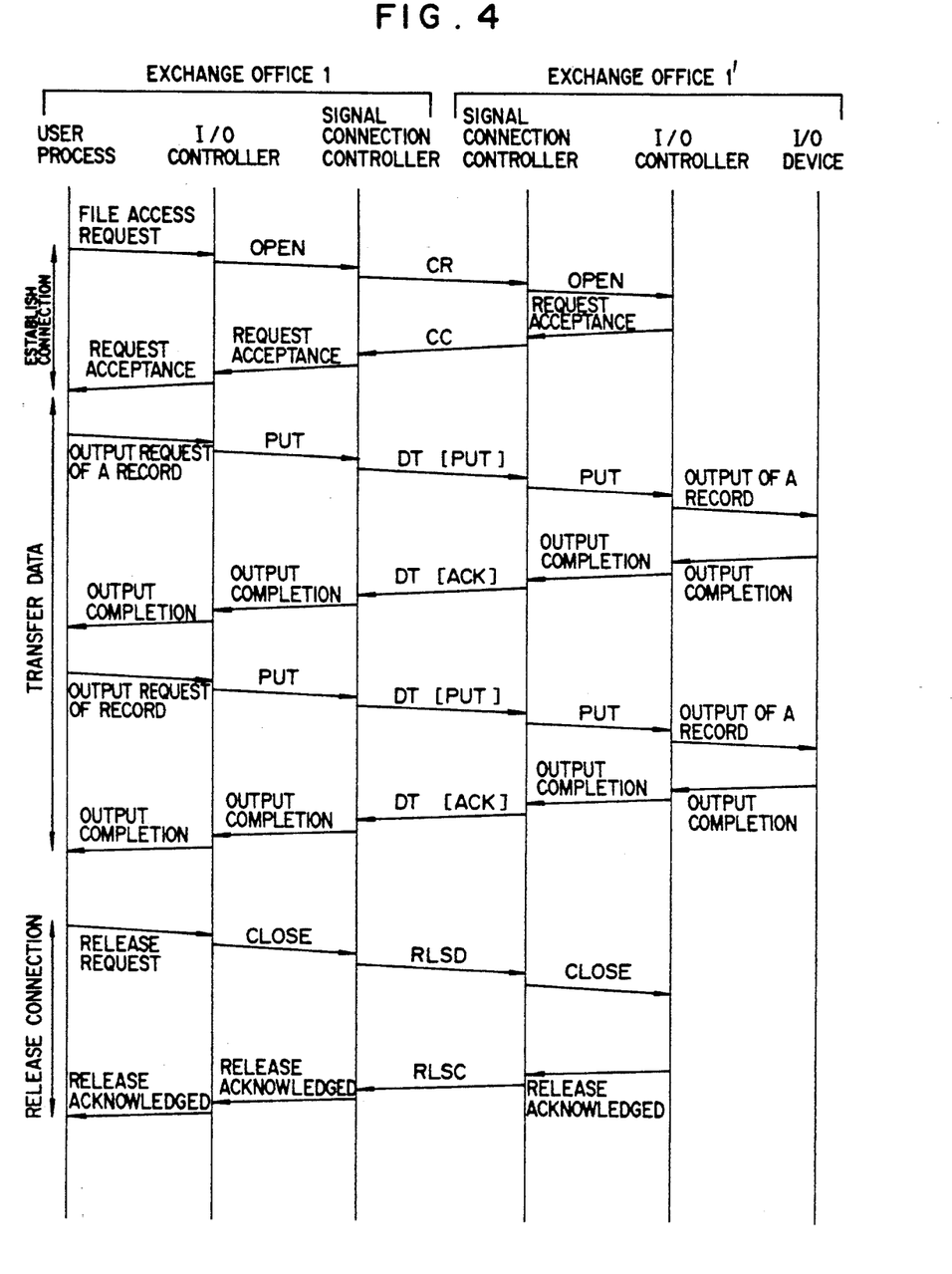
FIG. 4 is a diagram showing a sequence example of data transfer operations between exchange offices.

FIG. 4 shows a signal sequence example of a data transfer between the exchange offices 1 and 1' of FIG. 2. Referring now to the sequence chart of FIG. 4, a description will be given of an operation sequence in which a user process of the exchange office 1 of FIG. 2 establishes a temporary connection to the input/output device 5' of the office 1' to achieve a PUT operation for sequentially storing records in a specified file according to a specified access format. First, when the input/output control functional block 10 receives a file access request issued from the user process of the office 1 and recognizes that the request is made to access a file in the exchange office 1', an OPEN request is issued with a specification of an exchange office name, a file name, and an access format to the signal connection control functional block 11.

Figure 5:
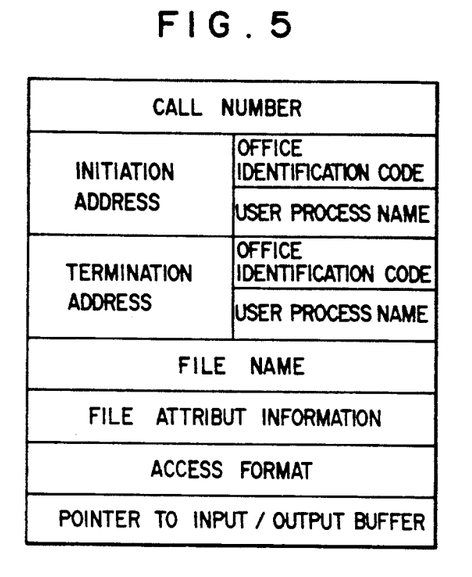
FIG. 5 is a diagram for explaining an example of signal connection control information of FIG. 2.

The signal connection control functional block 11 acquires a call number for the OPEN request and produces signal connection control information as shown in FIG. 5.

FIG. 5 is an explanatory diagram for explaining an example of signal connection control information created by the signal connection control functional block 11. The information of FIG. 5 includes a call number, an initiation address, a termination address, a file name, file attribute information, an access format, and a pointer to an input/output buffer. The call number is disposed to identify a connection. In the exchange office 1, a call number is acquired; whereas, in the exchange office 1', this field includes a connection establishing request signal (CR packet) from the office 1. Each of the initiation and termination addresses includes an office identification code and a user process name. In the office 1, these addresses are specified by the input/output control functional block (call connection control functional block) 10; whereas, for the office 1', a connection establishing request signal (CR packet) sent from the office 1 is included. In the office 1, the file name, the file attribute, and the access format are denoted by the input/output control functional block (call control functional block) 10; whereas, for the office 1', a connection establishing request signal (CR packet) from the office 1 is included. For the office 1, the input/output buffer pointer indicates a record data area designated by the user process; whereas, for the office 1', this pointer indicates a data area included in the signal.

Figure 6A:
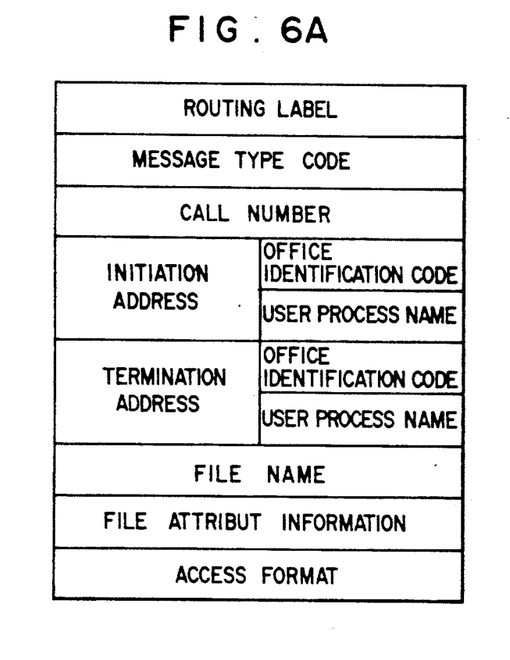
FIGS. 6A and 6B are explanatory diagrams for explaining examples of signaling procedures between exchange offices for establishing a signal connection and for transferring data between exchange offices, respectively.
Figure 6B:
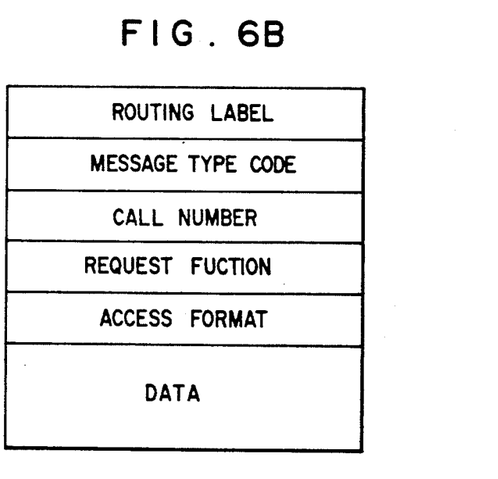

FIGS. 6A and 6B are explanatory diagrams for explaining an example of signal format between exchange offices in cases where a signal connection is established and where data is transferred after the connection is established. FIG. 6A shows an example of a connection establishing request signal (CR packet) to establish a signal connection as shown in FIG. 4. A routing label and a message type code of a signal format stipulated in the No. 7 common channel signaling procedure include additional information such as signal connection control information of FIG. 5 necessary for the signal connection control functional block 11 to establish a connection.

When a CR packet is received by the exchange office 1', the signal connection control functional unit 11' issues an OPEN request to the input/output control functional unit 10'. If the control functional block 10' accepts the request, the signal connection control functional block 11' notifies the condition to the call initiation office 1 by use of a connection control (CC) packet. With this operation, the connection is completely established. Thereafter, when the input/output control unit 10 issues a PUT or GET request for each record associated with the data transfer, an access is made to a file in an input/output device (on a hard disk) 5' of the exchange office 1'. When the record size exceeds the packet length for the transfer via the message transfer functional block 12, the signal connection control functional block 11 subdivides the record into subrecords, which are then transferred to the office 1'. The exchange office 1' supports a blocking procedure to gather received signals of the subrecords into a block.

FIG. 6B shows an example of a format of signals between exchange offices in a data transfer. The signal connection control functional block 11 carries out a sequence control with respect to packet transmission and reception and conducts a retransmission control procedure when a sequence abnormality or any other abnormal state is detected. After the data transfer is completed, when the user process sends a connection release request, the input/output control functional block 10 issues a CLOSE request. In response thereto, the signal connection control functional block 11 transmits a release request signal (RLSD) to the communicating office 1', which in turn conducts a CLOSE operation of the file. When a completion of the file close operation is confirmed, the connection is completely released.

In the embodiments above, two exchange offices are connected to the line as particular offices directly associated with the file transfer. Naturally, a plurality of exchange offices are connected to form a network. Moreover, when a file transfer is carried out between exchange offices connected to the network, the file attribute information of FIG. 3 is updated when necessary.

Figure 7:
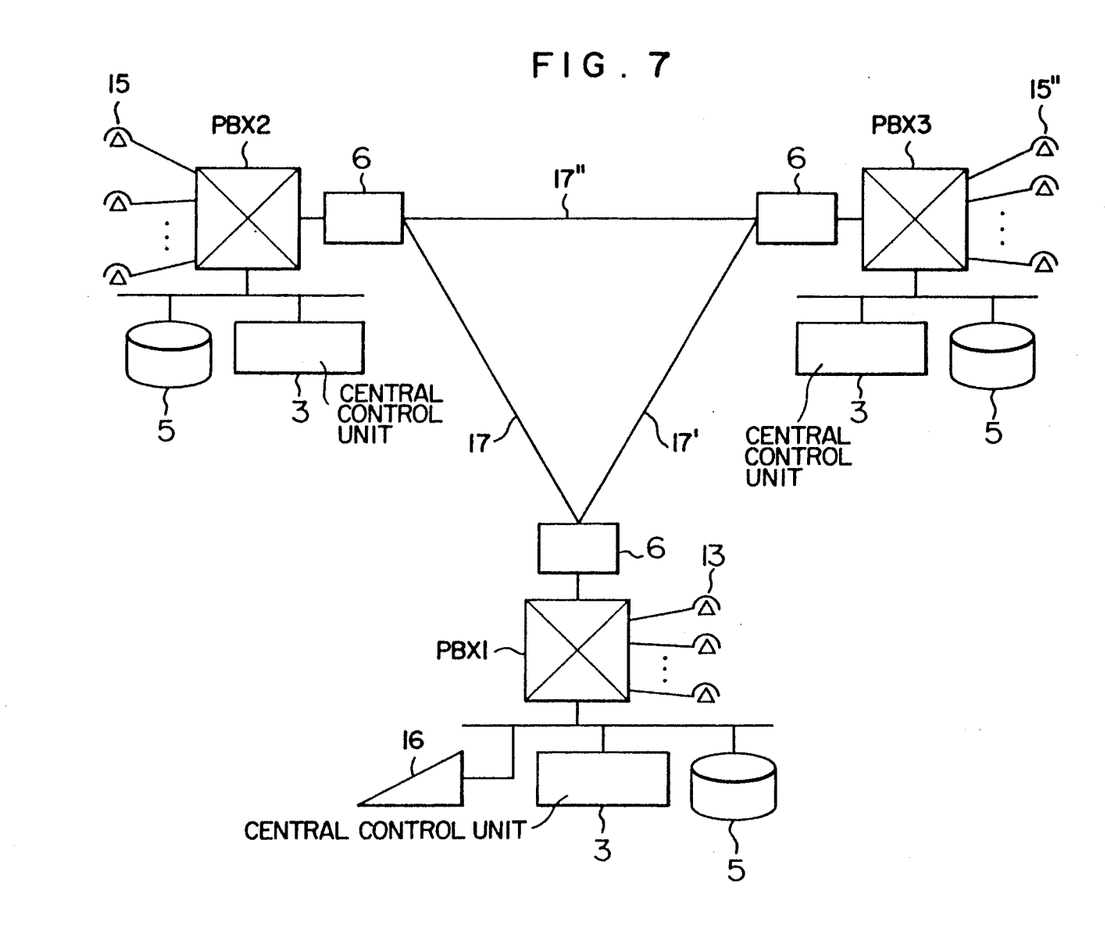
FIG. 7 is a diagram showing a relay method in another embodiment of a method of transferring data between exchange offices in accordance with the present invention.

FIG. 7 shows a repeating or relay procedure in another embodiment of the data transfer method between exchange offices in accordance with the present invention. The constitution of FIG. 7 is an example of a concentrated charging control method in a hotel business using terminals installed in hotel rooms. The terminals are operated in accordance with the data transfer method effected between input/output devices associated with exchange offices via the common channel signaling network of the embodiment shown in FIG. 1. In association with the configuration of FIG. 7, when the hotel is of a large size or when the check-in and check-out are conducted at an identical place rather apart from hotel rooms, a private branch exchange (PBX) is installed in each of the buildings of the hotel so as to connect the PBXs by means of a common channel link, thereby accomplishing a centralized or concentrated control of the PBXs. Referring now to the configuration of FIG. 7, a description will be given of an example of the concentrated control of charging information by use of terminals under control of PBXs.

Each of PBX1, PBX2, and PBX3 collects charging information of a terminal 15, 15', 15" accommodated therein to store the information on a hard disk 5, 5', 5" thereof. For each terminal 15, 15', 15" of the guest room, the charging information includes the total period of time of calls conducted by a visitor of the room during a stay in the hotel to communicating partners outside the hotel and details of charge for the calls. A job control terminal 16 is installed in the PBX1 to issue a request resetting, at a check-in operation for a room, the details of charging information associated with a terminal 15, 15', 15" of the room. The request is sent via the common channel signaling network (common channel signaling link) 17, 17', 17" to one of the PBXs in which the pertinent terminal 15 is accommodated. The PBX then resets or clears the detailed charge information related to the terminal 15 on the hard disk 5. At a check-out operation, the job control terminal 16 of the PBX1 is operated to make a request to read charging information associated with the terminal 15 of the pertinent room. The request is transmitted via the common channel signaling network 17 to a PBX accommodating the terminal 15. The PBX then reads details of charging information related to the terminal 15 from the hard disk 5 and then sends the information to the PBX1. With provision of the function in which each PBX reads out charging information under control thereof when necessary, the centralized control of the charging information is accomplished.

According to the embodiment above, in a data transfer between input/output devices respectively disposed in exchange offices, the data is passed in a form of a signal packet via a common channel signaling network as means for transferring signals between exchange offices. This consequently enables the data transfer to be carried out without reserving a telephone or communication line. Moreover, a highly reliable packet transfer supported by the common channel signaling network can be achieved. Resultantly, the line utilization efficiency and the transfer data reliability are improved.

While particular embodiments of the invention have been shown and described, it will be obvious to those skilled in the art that various changes and modifications may be made without departing from the present invention in its broader aspects.

I claim:

1. An exchanging system in which data transfers are conducted between a plurality of exchange offices connected to each other by a signalling line such that data is transferred between file means including files associated with the respective exchange offices and each of said exchange offices, comprising:
    user process means for outputting an input/output request to a file of a particular exchange office of a user,
    input/output control means operative in response to the input/output request to a file included in said file means of a particular exchange office received from said user process means for outputting an access request to an exchanging system of another particular communicating exchange office to which the file means including said file belongs; and
    signal connection means, operative based on the access request to the particular exchange office received from said input/output control means, for outputting signal connection control information to said another particular exchange office, thereby establishing a connection to said another particular exchange office to which the file belongs.

2. An exchanging system according to claim 1 wherein:
    said signal connection means outputs, on receiving from said another particular exchange office a call termination request of a connection to said another exchange office, the signal connection control information to said input/output control means; and
    said input/output control means establishes a connection to said file means of said particular exchange office, said file means includes a particular file being identified by the received signal connection control information.

3. An exchanging system according to claim 1, each of said exchange offices further including message transfer means for receiving as an input thereto the signal connection control information outputted from said signal connection means and for accomplishing, based on the signal connection control information, a message transfer with said another particular communicating exchange office in accordance with a common channel singaling method.

4. An exchanging system according to claim 1 wherein the input/output request to a file of a particular exchange office received from said user process means is at least one of a connection request to the file, a data transfer, and a request for a release of a connection.

5. A method of transferring data between exchange offices for use in an exchanging system in which data transfers are conducted between a plurality of exchange offices connected to each other by a singaling line such that data is transferred between file means for storing files associated with the respective exchange offices, comprising the steps of:
    establishing, for each input/output request from a user, a singaling connection to be employed in a data transfer between an exchange office associated with the user and a particular exchanging system of a communicating exchange office;
    subdividing data to be transferred between the exchange offices into packets each having a fixed length; and
    transmitting the packets each having the fixed length via a common channel signaling network, thereby achieving a transfer of the packets.

6. A method according to claim 5 wherein the signaling connection to be employed in a data transfer between an exchange office associated with the user and a particular exchanging system of a communicating exchange office is established at a transmission of a file access request packet.

7. A method according to claim 5 wherein the data to be transferred between the exchange offices includes a file defined by a predetermined record length, said file being provided with file attribute information uniquely stipulated for each said file in the exchanging system.

8. A method according to claim 7 wherein the file attribute information includes information related to a format of the file and information associated with an input/output device of the file.

9. A method according to claim 5 wherein said common channel signaling network, which enables the data transfer to be carried out without reserving telephone or communication lines, is in a link form, and file means storing files of input/output devices respectively connected to the exchange offices can be accessed from any exchange office between the exchange offices,
    said any exchange office managing control of files of all the exchange offices.

* * * * *